Jan. 17, 1961  H. B. WHITEHURST  2,968,622
MAGNETIC CERAMIC FIBERS AND METHOD OF MAKING SAME
Filed Dec. 30, 1958  2 Sheets-Sheet 1

INVENTOR.
HARRY B. WHITEHURST
BY
ATTORNEYS

Jan. 17, 1961  H. B. WHITEHURST  2,968,622
MAGNETIC CERAMIC FIBERS AND METHOD OF MAKING SAME
Filed Dec. 30, 1958  2 Sheets-Sheet 2

INVENTOR.
HARRY B. WHITEHURST
BY
ATTORNEYS

United States Patent Office 2,968,622
Patented Jan. 17, 1961

2,968,622

MAGNETIC CERAMIC FIBERS AND METHOD OF MAKING SAME

Harry B. Whitehurst, Newark, Ohio, assignor to Owens-Corning Fiberglas Corporation, a corporation of Delaware Filed Dec. 30, 1958, Ser. No. 783,814

14 Claims. (Cl. 252—62.5)

This invention is related to production of synthetic fibers having ferromagnetic properties and a high resistivity, and more specifically to a method and a product wherein continuous ceramic filaments are provided magnetic properties while being electrically of relatively non-conducting character.

It has been found that a magnetic anisotropy can be established in glassy filaments by the attenuation of the glassy material into rod-like forms of compositions containing metallic compounds such as iron, chromium, nickel, or cobalt oxides. The attenuation of the molten forms of such batch compositions causes a mechanical alignment of the atomic domains within the structure resulting in the rod-like form. It has been further found that rod-like forms of smaller diameter such as in the order of 0.1" have a greater percentage of anisotropy than rodlets of larger diameter.

According to the present invention, it is an object to produce small diameter filaments of ceramic materials having crystalline characteristics, and to make such fibers by a process which will advance their magnetic anisotropy to produce what would be termed a highly resistive or non-conducting magnetic ceramic filament.

In brief, the process of the present invention entails attenuation of a molten ferromagnetic material, as well as solutions or molten mixtures of ferromagnetic materials with other mixtures of oxides such as glass, into an extremely fine filament and to promote crystallization of the material in a manner such that the crystals are oriented with a predominant alignment parallel to the length of the fiber. The process of forming and orienting the crystals involves first, the attenuation of the continuous fiber from a stream of the molten ferritic material to effect a mechanically oriented atomic distribution therein, and then a rapid chilling thereof to cause a freezing of the atomic distribution in the oriented fashion. The magnetic properties are first promoted by the mechanical attenuating forces acting on the plastic or semi-plastic material, with or without the associated influence of a magnetic field, to thereby cause an aligned distribution of the atomic elements; while a freezing by rapid chilling of the material to a solid state when the atomic elements are in such aligned fashion results in their more positive incorporation in the structure in the aligned relation for magnetic properties.

Formation of crystals of the aligned atomic elements is thereupon advanced by reheating and exertion of magnetic forces on the structure to additively align the atomic elements simultaneously with, or immediately after, thermal breeding of crystals from the atomic elements, whereupon a second freezing of the structure under a magnetic influence till the filament reaches a state of permanence in form results in a magnetic filament of relatively non-conducting character.

A feature of the invention lies in the product itself having a wide range of adaptability to use for production of electrical components such as coils, instrument magnets, computer components, transformers, inductors, switching elements, memory devices, and a wide range of high frequency equipment.

Additionally, the product can be produced at high rates of speed in the order of from 1000 to over 15,000 feet per minute and can be made of low cost materials not requiring special preparation other than homogeneous mixture during the melting process.

Another feature lies in that the fundamental continuous filament is capable of ready utilization in forms such as coils of helical configuration; spiral, flat or planar forms such as pancake coils; or plate-like structures capable of formation into combination capacitance and inductive structures, all of highly resistive yet magnetic character. The continuous filament form of such magnetic material can also be chopped and incorporated into composite structures such as plastic composites incorporating the magnetic ceramic units, thereby permitting formation of magnetic structures of practically any moldable shape. Accordingly, the magnetic units can be utilized in the production of a large variety of magnetic structures for electrical equipment such as motors, generators, electronic equipment, high frequency components, etc.

Other objects and features of this invention will become apparent as the following description progresses in relation to the process involved in the production of the non-conducting magnetic filament.

Figure 1:
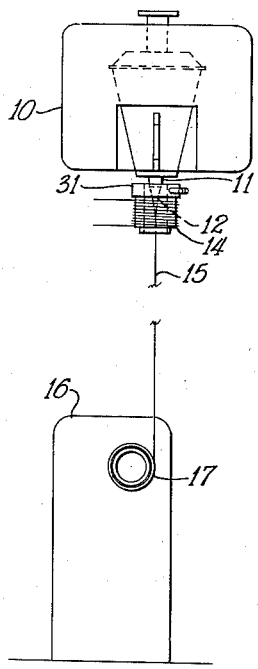
Figure 1 is a somewhat schematic general arrangement of apparatus for producing the basic filaments of the present invention.

Referring to the drawings in greater detail, Figure 1 shows a melting unit 10 for heating and melting the supply of solid materials utilized in forming the molten ceramic material from which the magnetic ceramic filament or continuous fiber of this invention is produced.

A feeder 11 associated with the melting unit 10 supplies a flowing stream 12 of the molten material from an orificed tip 11. The stream is arranged to pass through a magnetic field provided by a D.-C. field developed by a magnetic coil unit 14 on a ceramic tube 30 concentric therewith. The tube 30 is of non-magnetic ceramic and electrically non-conducting material which will withstand the temperature of the molten material attenuated from the tip 11 and is provided with a fluid cooled section 31 having a channel 32 to cause a chilling of the cone 12 on its passage through the tube. The stream is attenuated into the form of a filament 15 which is collected on a cylindrical tube 17 by a rotating collet winder 16.

Attenuation and collection of the filament 15 can be accomplished at speeds ranging in the order of from 1000 to 15,000 feet per minute, and in view of this rapid rate of attenuation, the material in the stream 12 is caused to be jerked or stretched into molecular alignment in which atomic domains are fixed in patterned relation conducive to alignment as a magnetic structure.

The magnetic field provided by the field emitting unit 14, although not necessary in all instances, such as those where devitrification of the material does not occur in the filament-forming process, is in many instances of advantage even where only minute magnetic alignment of atomic elements is thereby accomplished.

Where the materials being formed into the filament are of a character such that devitrification occurs during the filament-forming process, the magnetic unit 14 is of definite advantage in effecting preliminary alignment of the crystal base nuclei or crystals themselves formed during devitrification. Devitrification occurs predominantly in the zone of the tip of the fiber-forming zone or immediately below the tip of the cone being attenuated into the filament, and for some compositions, the influence of magnetic forces in this zone is sufficient to impart the desired magnetic property directly to the non-conducting filament being formed.

Figure 2:
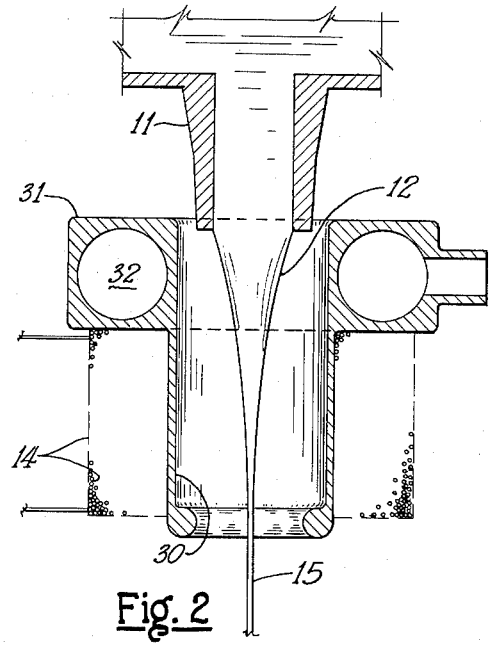
Figure 2 is an enlarged illustration of the fiber-forming zone of the arrangement of Figure 1.

In those cases where substantially no devitrification occurs, the subsequent treatment to cause devitrification and corresponding crystallization is effected by the arrangement of Figure 2 wherein the filament 15 is withdrawn from the tube 17 and passed through a heating zone such as may be provided by a tubular heater 20 connected to lines L1 and L2 for electrical heating energy. The filament 15 is reheated in this zone to a temperature where devitrification will occur as dictated by the devitrification characteristic of the filament material being treated. The atomic domains can be further aligned in this zone by provision of a magnet unit 21 extending over a portion of the length of the filament corresponding to the length of the tube. The length of the tube is made to be sufficient that for the speed of movement of the filament therethrough, it is raised to the devitrification temperature and then rapidly cooled upon withdrawal from the tube. Should it be desired to raise the temperature of the filaments slowly, the filament can be passed correspondingly more slowly through the heating unit 20; but should output of the process be desired at a more rapid rate, the tube 30 is made correspondingly longer to provide sufficient time in the heating zone, that the temperature desired is reached prior to withdrawal.

Figure 3:
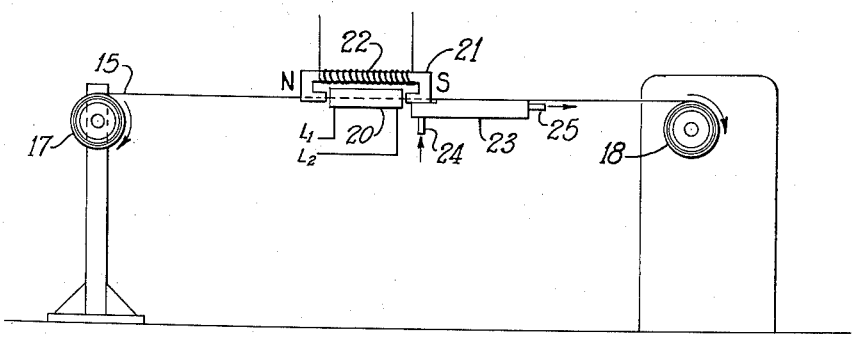
Figure 3 is a somewhat schematic illustration of an arrangement of after-treating apparatus for heating and magnetically treating filaments produced by the method of an arrangement of Figure 1 to further promote the magnetic anisotropy of the product produced.
Figure 4:
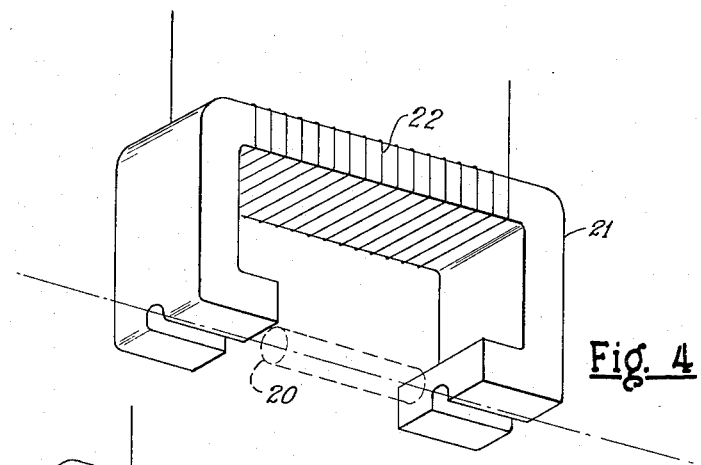
Figure 4 is an enlarged view of the grooved magnetic aligning unit of Figure 3 showing the relationship of the filament being treated in its passage thereacross.

Upon withdrawal of the filament from the heating zone it is passed over a cooling unit 23 to effect a quench thereof. The cooling unit 23 although being capable of embodiment in any of a wide range of forms, as illustrated, is a plate unit provided with cooling water supplied through an inlet 24, while heated water is exhausted by way of an outlet 25. In some instances it is found desirable to pass the filament directly through the cooling fluid. This can be accomplished by providing a porous top surface on the cooling unit 23 so that a film of moisture will form thereon for the filament to be drawn through for a quench. In other instances the filament is drawn through a cooling tube for a more gradual reduction in temperature for an annealing action.

Where magnetic alignment is promoted in the reheating process, a suitable magnetic unit 21 of a permanent magnet type or of electromagnet type energized by a direct current coil 22 is arranged in cooperative association with the heater 20. The unit 21 is preferably arranged to establish a field oriented over the length of the crystallization zone of the fiber into the cooling zone such as by extending the rear portion of the unit 21 over the cooling unit 23 as illustrated in Figure 3. By this arrangement the magnetic alignment is maintained within the filament structure until sufficient cooling is effected to freeze the alignment therein. The heat treated filament 15 is then collected on a rotating collection tube for subsequent fabrication into products utilizing the non-conducting magnetic characteristics.

Figure 5:
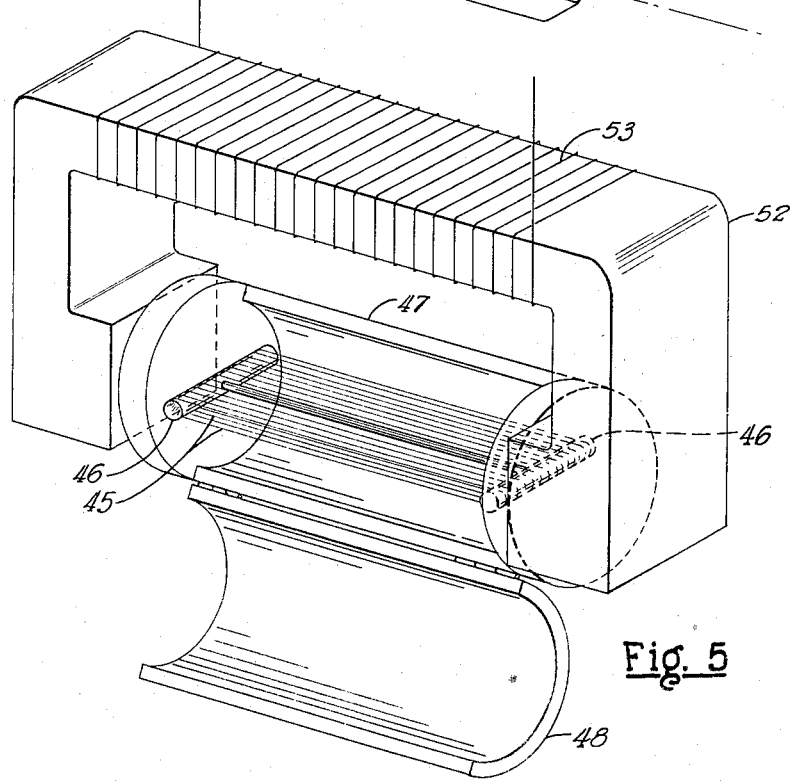
Figure 5 is an illustration of a general arrangement for imparting ferromagnetic properties to filaments of this invention by batch handling principles.

Figure 5 illustrates an arrangement of apparatus wherein a filament 45 is wound about a pair of heat resistant members such as ceramic rods 46 and is heated in such suspended relation within a furnace 47 having a door 48 illustrated in open position. By heating a filament so suspended to devitrification temperature following an initial orientation of atomic domains in the fiber-forming process, magnetically aligned crystallization for some materials will result without further magnetic alignment. Further alignment of such domains where necessary, however, can be provided by a magnetic unit 52 having its poles disposed at opposite ends of the furnace 47. The unit 52 can be of permanent or electromagnetic type energized by a direct current coil 53 wound thereon. The fiber 45 can be a single filament fiber, strand, or yarn supported within the furnace for treatment to impart the ferromagnetic properties.

In brief summary, the invention entails mechanical attenuation of a stream of molten form of magnetically alignable ceramic material, which mechanical attenuation causes a physical alignment of molecular and atomic domains which in turn is conducive, subject to magnetic treatment, to provision of magnetic properties upon subsequent crystallization of such inclusions. Magnetic anisotropic crystallization of the filament is accomplished in subsequent heat treatment wherein the thermal history of the filament is controllably modified. Magnetic treatment, during and after heat-treatment, further promotes the crystallite alignment to impart electromagnetic properties, which during the cooling or freezing process are permanently fixed in the structure at temperatures dependent upon the characteristics of the ceramic utilized to form the filament.

Examples of ferrite materials which have proven of character which will produce magnetic non-conducting ceramic filaments of this invention are oxides with the formula $MeO-Fe_2O_3$ where Me represents divalent Mn, Fe, Co, Ni, Cu, Zn, Cd, and Mg, or two or more of these in mixed crystals, as well as oxides such as spinels containing titanium where the system formula is $$NiFe_2O_4-Ni_{1.5}FeTi_{0.5}O_4$$

or aluminum where the system formula is $$NiFe_2O_4-NiFeAlO_4$$

or ferromagnetic oxides containing chromium where the system formula is $Li_{0.5}Fe_{2.5}O_4-Li_{0.5}Fe_{0.5}Cr_2O_4$, or where the system formula is $MnFe_2O_4-MnCr_2O_4$.

In addition to simple heating and cooling of the filament to develop the desired ferromagnetic properties in the filament by use of apparatus of Figure 3, the filament may be specially treated such as by heating the fiber in a special atmosphere, or cooling slowly in an atmosphere of special composition to anneal the material or to cool rapidly in material such as a solution of sodium chloride to effect a quench of the filament material.

For example, a filament made of material having the system formula $NiFe_2O_4-Ni_{1.5}FeTi_{0.5}O_4$, with various amounts of $Ni_{1.5}FeTi_{0.5}O_4$ can be cooled slowly from 800° C. in oxygen for an annealing action or can be quenched from 1200° C. by dropping the temperature rapidly in a sodium chloride solution on the cooling plate to produce the desired electromagnetic properties. Subsequent to the latter treatment, the fiber is rinsed with hot distilled water to wash the extraneous materials therefrom. With the $NiFe_2O_4$ concentrations increasing to 100%, the magnetic moment correspondingly increases, but with more $Ni_{1.5}FeTi_{0.5}O_4$ present, the moment decreases and is slightly larger for annealed samples than for quenched samples.

Fibers can also be made according to this invention of molten solutions or mixtures of ferromagnetic materials with other mixtures of oxides such as glass wherein the glass forms a matrix for the primary ferrite phase which crystallizes. The glass in such instances acts as a cementing matrix for the ferritic magnetic material.

As pointed out above, preliminary magnetic alignment of atomic domains would not be necessary in all instances since mechanical alignment for subsequently formed crystals occurs in the mechanical attenuation step which promotes the magnetic alignment for ferromagnetic properties. By provision of the mechanically aligned crystals a stronger magnetic field results in the axial direction, the preferred direction. In many instances where such magnetic alignment is not present, the magnetic axes of many of the micro-crystals are not pointed in a direction for provision of optimum magnetic properties. Under such conditions only a small component of the magnetic potential can be used for the desired results in the randomly oriented arrangement of crystals.

For some of the materials the crystals are larger than others, and in the present instance, the crystal size can be substantially up to the size of the fiber diameter when the crystals are dispersed in a glassy matrix providing a continuity to the fibers formed. Where a glassy matrix exists in the fibers formed, the ferritic crystals can be aligned parallel to, or perpendicular to the fiber axis. Such alignment is accomplished by alignment of the atomic domains with proper field orientation at the fiber-forming cone, as well as in the subsequent heat treating process.

Although the materials herein have been described as ferromagnetic materials, it will be understood that they are generally of the type classified as derivatives of $Fe_3O_4$. The invention is not limited specifically to such derivatives, however, but extends into the larger class of minerals classified as spinels ($MgAl_2O_4$), sometimes considered a more exact description of the material. Permanent magnetic type materials comprising derivatives of natural mineral magnetoplumbite ($PbFe_{12}O_{19}$) or such a composition where barium or strontium is substituted for the lead can be advantageously formed into a fiber according to this invention.

While I have shown and described certain particular forms of my invention, it will be understood that I do not wish to be limited thereto since many modifications may be made within the concepts of the invention and I, therefore, contemplate by the appended claims to cover all such modifications which fall within the true spirit and scope of my invention.

I claim:

1. A continuous flexible fiber made of ferromagnetic ceramic material.

2. A continuous flexible magnetic fiber of ferritic material in which the magnetic moments are predominantly oriented according to a preselected aligned pattern.

3. A continuous flexible fiber of ferritic material in which the magnetic moments are substantially unidirectionally oriented.

4. A continuous flexible electrically non-conductive magnetic fiber of ferritic material in which the magnetic moments are substantially uniformly oriented axially thereof.

5. A continuous flexible non-conductive magnetic fiber of ferritic material in which crystals are physically oriented according to a predetermined aligned pattern and in which the magnetic moments of the crystals are predominantly oriented according to a corresponding predetermined desired aligned pattern.

6. A continuous flexible fiber of ferritic material in which the composition formula is $MeO-Fe_2O_3$ wherein Me represents any one of the divalent forms of the group of elements consisting of Mn, Fe, Co, Ni, Cu, Zn, Cd, and Mg.

7. A flexible fiber made of ferritic material which is crystallized, and in which the magnetic moments have been substantially undirectionally oriented to establish ferromagnetic properties.

8. A continuous flexible fiber of ferritic material which is crystallized and in which both the crystals and their magnetic moments have been directionally oriented according to a preselected desired aligned pattern of orientation.

9. A method for making a thin flexible fiber having magnetic properties of crystallizable fiber-forming material in which the magnetic moments are capable of alignment comprising mechanically attenuating from a molten stream a fiber of such magnetically alignable material, cooling said fiber, reheating said fiber to at least the devitrification temperature of such material and again cooling said fiber to effect a crystallization thereof, and aligning the magnetic moments of said material as crystallization occurs.

10. A method for making a fiber of crystallizable fiber-forming material having magnetic properties in which the magnetic moments are capable of alignment, comprising mechanically attenuating a thin continuous fiber of such magnetically alignable material to physically align the crystal nuclei of such material according to a predetermined pattern, cooling said fiber as it is attenuated and simultaneously subjecting the cooling fiber to magnetic influences effecting alignment of the magnetic moments of such material, reheating said fiber and again cooling said fiber to carry through completion of the crystallization of the fiber material.

11. The method of claim 10 wherein the fiber is subjected to forces of a magnetic field during reheating and cooling from such reheat to further promote desired alignment of magnetic moments of such material.

12. The method of claim 10 wherein the fiber after reheating is quenched and simultaneously subjected to magnetic influences to effect a predetermined desired alignment of magnetic moments of such material.

13. The process of claim 6 wherein the fiber after reheating is gradually cooled and subjected to the influences of a magnetic field to unidirectionally align the magnetic moments as crystallization of the magnetic domains occurs.

14. A method for making a fine fiber of crystallizable fiber-forming material having magnetic properties in which the magnetic moments are capable of orientation comprising mechanically attenuating into a fiber of less than 0.1" diameter a molten stream of such magnetically alignable material, subjecting the stream to the influences of a unidirectional magnetic field to preliminarily align the magnetic domains therein, cooling said fiber under the influences of said magnetic field, reheating said fiber to at least the devitrification temperature of said material, subjecting said fiber to the influences of a second unidirectional magnetic field and simultaneously cooling said fiber as crystallization of said material occurs to further orient the magnetic moments of said material as cooling occurs.

References Cited in the file of this patent

UNITED STATES PATENTS

| | | |
|---|---|---|
| 2,499,789 | Smelt | Mar. 7, 1950 |
| 2,762,778 | Gorter et al. | Sept. 11, 1956 |
| 2,825,670 | Adams et al. | Mar. 4, 1958 |
| 2,887,454 | Toulmin | May 19, 1959 |